Oct. 24, 1939.   H. W. PRICE   2,177,459
TRANSMISSION CONTROL
Filed Sept. 26, 1938   3 Sheets-Sheet 1
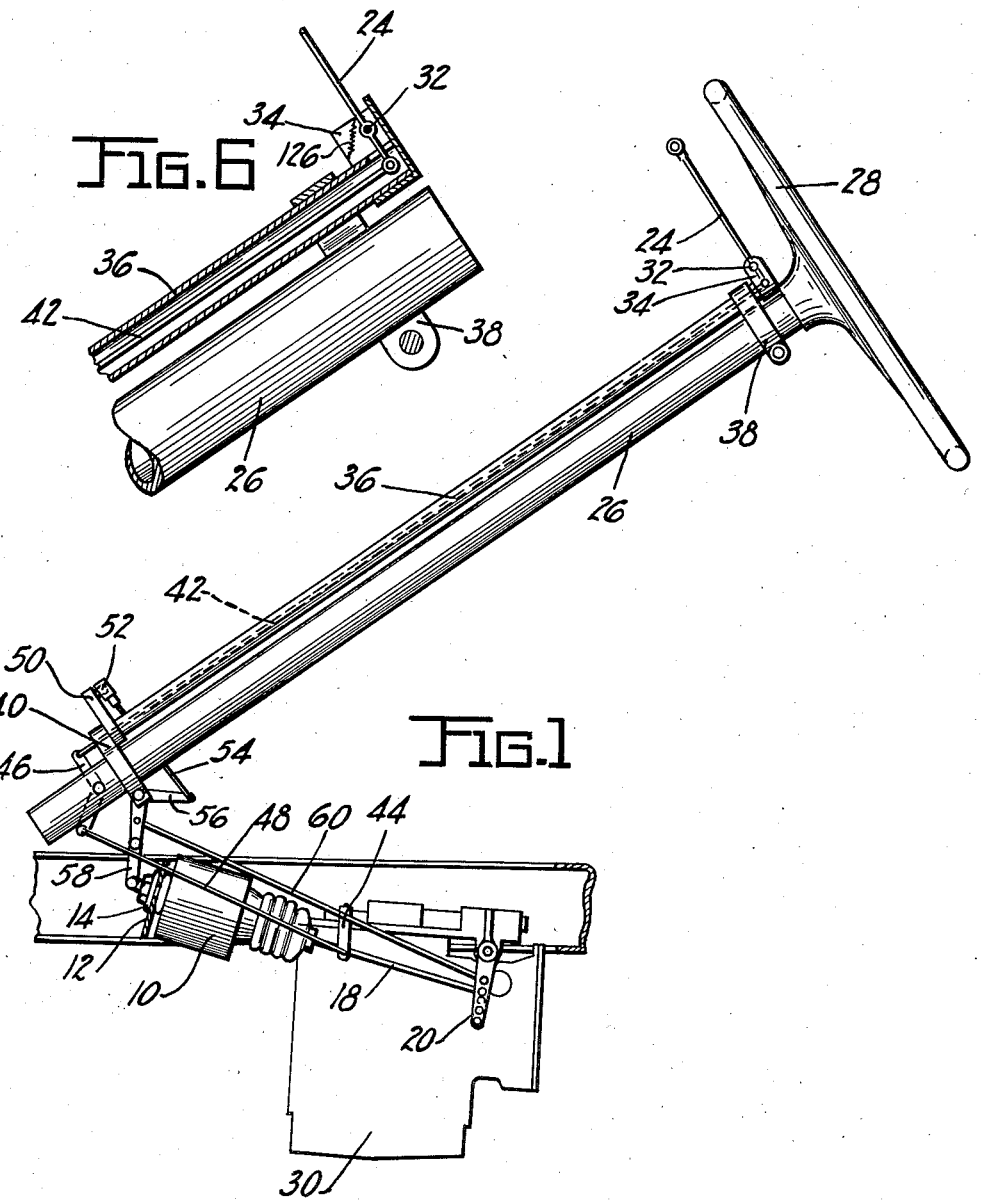
INVENTOR.
HAROLD W. PRICE
BY H. O. Clayton
ATTORNEY.

Oct. 24, 1939.  H. W. PRICE  2,177,459
TRANSMISSION CONTROL
Filed Sept. 26, 1938  3 Sheets—Sheet 2
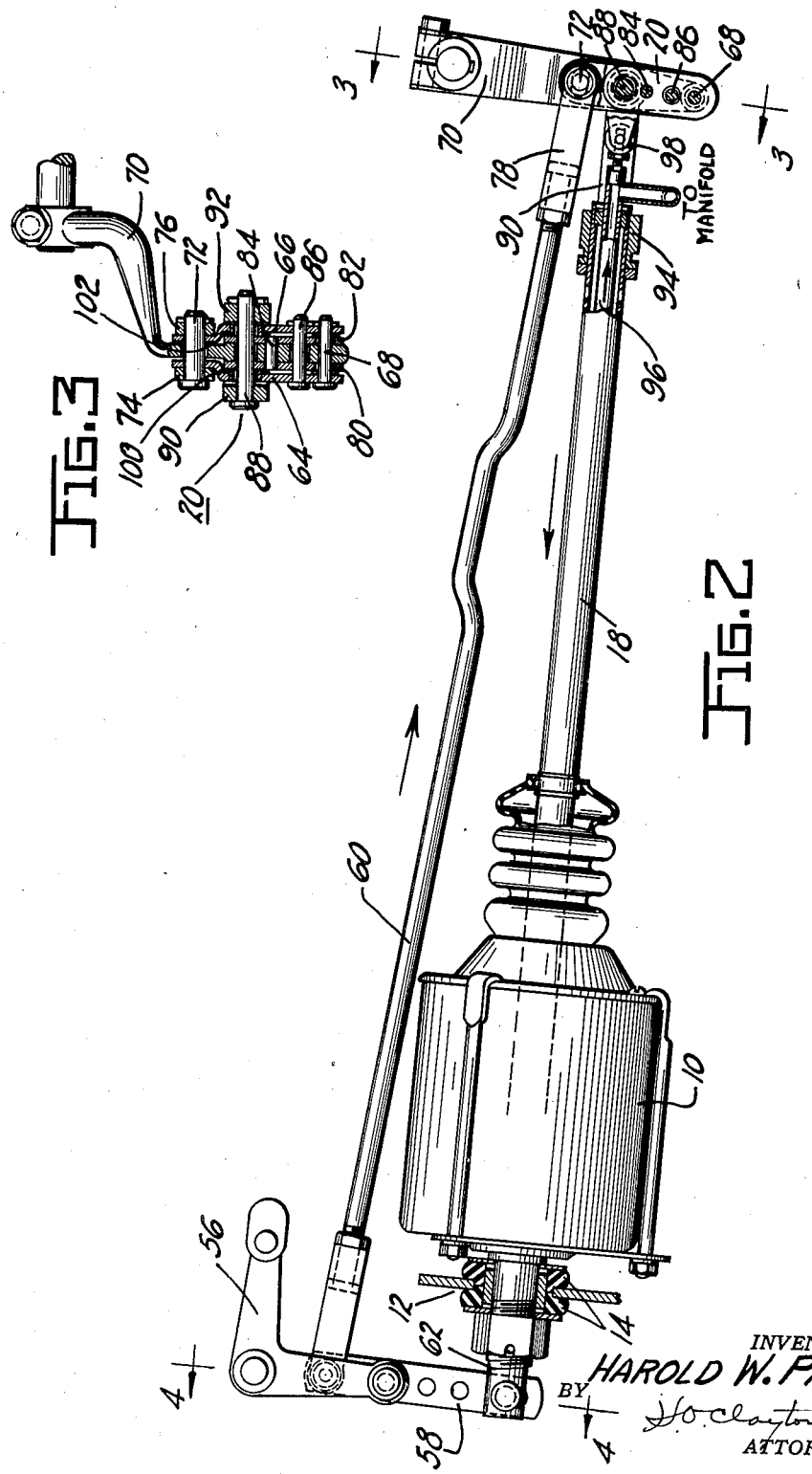
INVENTOR
HAROLD W. PRICE
BY H.O.Clayton
ATTORNEY Oct. 24, 1939.  H. W. PRICE  2,177,459
TRANSMISSION CONTROL
Filed Sept. 26, 1938   3 Sheets-Sheet 3

INVENTOR.
HAROLD W. PRICE
BY  J.O.Clayton
ATTORNEY.

Patented Oct. 24, 1939

2,177,459

UNITED STATES PATENT OFFICE 2,177,459

TRANSMISSION CONTROL

Harold W. Price, South Bend, Ind., assignor to Bendix Aviation Corporation, South Bend, Ind., a corporation of Delaware Application September 26, 1938, Serial No. 231,665

4 Claims. (Cl. 74—335)

This invention relates to transmission mechanism, and particularly to an operating means for the change-speed transmission of an automotive vehicle.

The tendency of design of modern automotive vehicles, and especially passenger vehicles, is to lower the center of gravity to a greater extent: furthermore, there is a tendency to increase the number of units of the power plant. There is accordingly less available space for such adjuncts as a transmission operating pressure differential operated power means, for example, of the type disclosed in Moorhouse Patent No. 1,993,015. This patent discloses a vacuum operated motor mounted alongside the transmission casing and controlled by linkage interconnecting the transmission, motor, control valve therefor and the gear shift lever.

The principal object of the invention therefore is to provide a simple and compact mechanism for operating the conventional change-speed transmission of an automotive vehicle, said mechanism, by virtue of its simplicity and compactness, being easily installed during the assembly of a new vehicle and also easily incorporated in a used vehicle.

Yet another object of the invention is to provide a transmission operating power unit including a motor, control valve therefor and interconnecting linkage, which may be controlled by a selector mounted within easy reach of the driver of the vehicle. As another feature of the invention, this power unit cooperates with manually operated means, interconnecting the selector and transmission, for effecting the so-called cross-shift operation of the transmission, that is, the operation of selecting the transmission shift rail to be operated.

Yet another object of the invention is to provide a transmission operating power unit, constituting the major portion of the transmission operating mechanism of my invention, including so-called reactionary valve operating linkage to provide the desired feel; by this is meant a mechanism whereby the driver of the vehicle, by virtue of the effort required to operate the aforementioned selector mechanism, is at all times during the gear shifting operation conscious of the force necessary to place the gears in mesh.

Other objects of the invention and desirable details of construction and combinations of parts will become apparent from the following description of a preferred embodiment, which description is taken in conjunction with the accompanying drawings, in which:

Figure 1 is a side elevational view of the transmission operating mechanism constituting my invention;

Figure 2 is a side view of the power unit of the mechanism of Figure 1, said unit constituting the essential feature of my invention;

Figure 3 is a sectional view, taken on the line 3—3 of Figure 2, disclosing in detail the most important elements of the valve and transmission operating linkage disclosed in Figure 2;

Figure 6 is a view, partly in section, disclosing the details of the manually operated selector for controlling the transmission operating mechanism constituting my invention.

Figure 5:
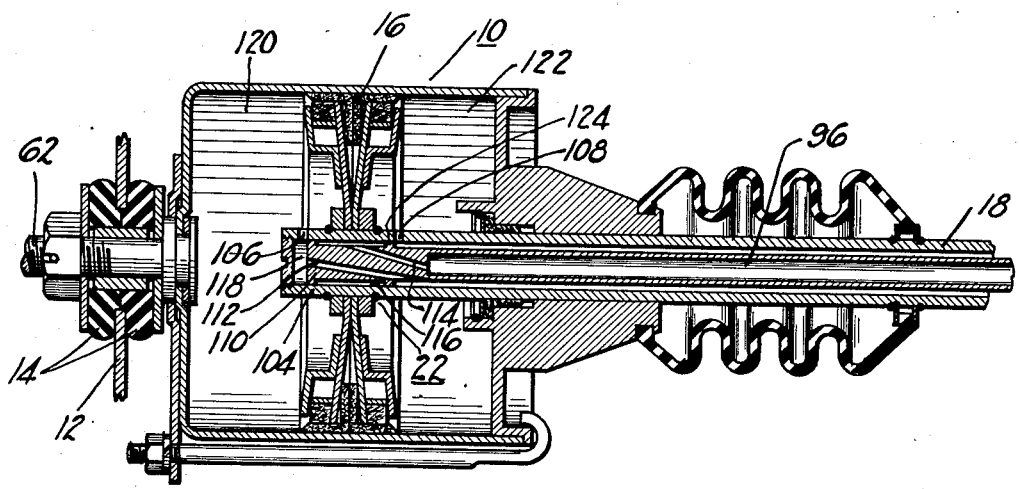
Figure 5 is a longitudinal sectional view disclosing, in detail, the construction of the transmission operating motor of my invention and the control valve therefor.

There is disclosed in Figure 1 a preferred embodiment of my invention in which a double-ended air-suspended pressure differential operated motor 10 is detachably secured by a bracket 12 to one of the channel members of the chassis of the vehicle. This mounting preferably includes members 14 of yieldable material such as rubber. In most vehicles of the day, the chassis includes at least one of such channel members on each side of the vehicle and extending lengthwise thereof. The piston member 16 of the motor, that is the power element thereof, is connected by a hollow connecting rod 18 to a valve and transmission operating linkage unit 20, disclosed in detail in Figure 3 and described in detail hereinafter. A follow-up to-lap or so-called self-lapping type of valve mechanism 22 for controlling the operation of the motor is housed within the motor, said mechanism, together with transmission mechanism for selecting a shift rail to be operated, being operated by a manually operating selector 24 mounted on the steering column 26 of the vehicle immediately beneath the steering wheel 28.

The step type of selective transmission 30 operated by the mechanism constituting my invention is of a conventional type, including the usual two shift rails and the aforementioned selector and operating mechanism therefor: accordingly, the same is not disclosed in detail and no claim is made thereto.

The principal elements of the mechanism constituting my invention having been briefly described, the operation of selecting the low and reverse shift rail of the transmission 30 and an operation of said rail to establish the transmission in low gear will now be described in detail. Such description will incidentally describe, in detail, my transmission operating mechanism.

After the clutch has been disengaged, the selector 24 is rotated clockwise, toward the steering wheel and in a plane perpendicular thereto. The selector is pivotally mounted upon a pin 32 housed within a casing 34 secured to the upper end of a hollow tube 36. This tube is secured by brackets 38 and 40 to the steering post 26 and extends parallel thereto. At the inner end of the selector 24 there is pivotally secured a rod 42, which is housed within the tube 36. A crank 44 for operating the shift rail selector mechanism of the transmission is connected to the lower end of the rod 36 by a bell crank 46 and a link 48, all as disclosed in Figure 1 of the drawings. As will be apparent from an inspection of Figure 1, the aforementioned clockwise rotation of the selector 24 serves to place the link 48 in compression to rotate the crank 44 counterclockwise and so operate the selector mechanism of the transmission as to select for subsequent operation the low and reverse shift rail.

The selector is then rotated clockwise in a plane parallel to the plane of the steering wheel, thereby effecting a clockwise rotation of the tube 36 about its longitudinal axis. This tube is connected to the aforementioned valve and transmission operating linkage unit 20 by a crank 50, a ball and socket unit 52, a link 54, a bell crank lever 56, a crank 58 and a link 60. As disclosed in Figure 2, the crank 58 is adjustably mounted to a stud 62 extending from the mounting unit 12 and the bell crank 56 is adjustably mounted with respect to the link 60, thereby providing means for varying the leverage of the connection between the unit 20 and the selector, and accordingly varying the timing of operation of the control valve 22 of the motor 10. The crank 58 may be secured to the bracket 40.

When the tube 36 is rotated clockwise, the link 60 is placed in compression and moved in the direction of the arrow disclosed in Figure 2. Referring now to Figure 3, disclosing the details of the transmission and valve operating linkage unit 20, such a movement imparts a clockwise angular rotation of valve operating lever members 64 and 66, which are pivoted at their lower ends to a pin 68 extending through the lower end of a shift rail operating crank arm 70. The upper ends of the levers 64 and 66 are pivotally connected, by means of a pin 72, to furcations 74 and 76 of a member 78, the latter being adjustably connected to the link 60. So-called reaction links 80 and 82 are pivotally connected by a pin 84 to the crank 70, and these links are pivotally connected to the levers 64 and 66 by a pin 86. Accordingly, the clockwise rotation of the levers 64 and 66 about the pin 68 as a fulcrum imparts a counterclockwise rotation of the reaction links 80 and 82. To the upper ends of the latter links there are pivotally secured, by a pin 88, furcations 90 and 92 extending from a hub portion 94 sleeved over and fixedly secured to the connecting rod 18. The counterclockwise rotation of the reaction links thus bodily moves the rod 18 to the left, in the direction indicated by the arrow in Figure 2. At the same time, the rod 18 is being moved to the left, a vacuum tube 96 housed within the rod is moved to the right, Figure 2, for this tube is adjustably connected at 98 to links 100 and 102, which are pivotally connected at their outer ends to the valve operating lever 64 and 66.

The valve mechanism 22 for controlling the operation of the air-suspended motor 10 is secured to the inner ends of the tube 96 and rod 18 and comprises an end portion 104 of the rod 18 ported at 106 and 108 and a spool-shaped valve member 110. The latter member is provided with ducts 112 and 114, the duct 114 interconnecting the recess 116 of the member with the interior of the tube 96 and the duct 112 interconnecting a chamber 118 with the interior of the rod 18.

Completing the description of the low gear establishing operation of my transmission operator, when the valve mechanism 22 is operated by moving the valve members 110 and 104 to the right and left respectively, the port 108 remains in communication with the chamber 118, thereby venting a chamber 120 of the motor 10 to the atmosphere, and the port 108 is placed in communication with the recess 116 to interconnect a chamber 122 of the motor with a source of vacuum, preferably the intake manifold of the vehicle's internal-combustion engine. The partial evacuation of the chamber 122 and the maintenance of atmospheric pressure within the chamber 120 result in the piston or power element 16 of the motor being subjected to a differential of pressures, forcing the piston to the right. The reactionary links 80 and 82 connected to the piston are rotated counterclockwise about the pin 86 as a fulcrum, this movement resulting in a load being transferred by the pin 84 to the transmission operating crank 70, moving the same counterclockwise to move the low and reverse shift rail in the direction to establish the transmission in low gear. In effecting this operation, the selector member 24 is held stationary, thus maintaining the pin 86 stationary. This pin, however, as previously described, serves as the fulcrum for the reactionary levers as the same are rotating to actuate the crank 70. Accordingly, the pin 86 and consequently the selector 24 are subjected to a force or load defined in this art as "feel", which load tends to move the selector back to its original position, that it, the position occupied prior to the opening or so-called cracking of the valve mechanism.

Describing the lapping operation of the valve, it will be remembered that during the above-described movement of the piston 16 to move the low and reverse shift rail the valve member 110 remains stationary, while the valve member 104 moves to the right. This results in a land 124, that is, the outer surface of one of the full bodied portions of the spool-shaped valve member 110, moving into registry with port 108, thus cutting off communication between the chamber 122 and the intake manifold, or other source of vacuum. The system is then in a state of equilibrium and the valve mechanism 22 is said to be lapped.

Should the selector 24 be again moved clockwise, in a direction to complete the meshing of the low gears of the transmission, the valve members 104 and 110 are again simultaneously moved relative to each other to again open or crack the valve. The above cycle of operations is then repeated and the valve is again lapped, if the selector is held stationary. Inasmuch as an additional quantity of air is evacuated from the chamber 122, there results a greater differential of pressure acting upon the piston 16: accordingly, the force reacting upon the selector is greater than that effected when the valve mechanism is first opened, as above described. The intermittent movements of the selector thus result in corresponding intermittent movements of the shift rail operating crank 70, until the gears are meshed and the transmission is established in low gear. The load or feel resisting the movement of the selector is directly proportional to the degree of movement of the shift rail as it moves toward its final position, that is, its position when the gears are meshed. Accordingly, the operation of the selector 24 closely simulates the operation of a conventional shift lever. For example, in operating such a conventional lever, the driver usually moves the same until the gear teeth abut, that it, until the so-called synchromesh mechanism functions, whereupon, due to the resistance to movement, he momentarily stops the movement of the lever. If the synchromesh mechanism has functioned and the resistance to movement of the shift lever has diminished, the driver resumes the movement of the shift lever to complete the meshing of the gears.

Now, with the power operated mechanism of my invention, the operation of the selector 24 substantially simulates the operation of the conventional gear shift lever, for when the synchronizing mechanism of the transmission is functioning, the resistance to movement of the selector, that is, the feel or reaction, is of sufficient magnitude to cause the driver to hesitate during the movement of the selector.

The low gear establishing operation of my transmission operating mechanism having been described in detail, it is believed unnecessary to describe the operation of the mechanism to place the transmission in second gear, high gear and reverse gear. Suffice it to say that to place the transmission in second gear the direction of movement of the selector lever is reversed. Thus, as is perfectely obvious from an inspection of the drawings and the operation of the mechanism heretofore set forth in considerable detail, reversing the direction of movement of the selector results in reversing the direction of movement of the piston 16. When the neutral position of the selector is reached, that is, when the transmission is in neutral, a spring 126 within the housing 34 automatically functions to rotate the selector clockwise to thus rotate the crank 46 clockwise and effect an operation of the selector mechanism within the transmission to select for subsequent operation the second and high gear shift rail of the transmission. Counterclockwise movement of the selector is then continued until the transmission is established in second gear.

Figure 4:
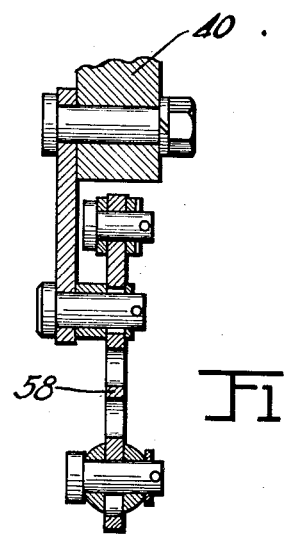
Figure 4 is a sectional view, taken on line 4—4 of Figure 2, of another portion of the valve and transmission operating linkage.

It is to be stressed that the essence of my invention lies in the construction and arrangement of the parts of the mechanism disclosed in Figure 2. As is obvious from an inspection of Figure 2, the arrangement of the links and levers of the unit 20 provides a very compact structure. The position of the valve operating link 60, extending as it does substantially parallel to the rod 18, is an important feature of my invention, as are the construction and arrangement of the valve operating levers 56 and 58 disclosed in Figure 4. In short, the mechanism disclosed in Figure 2 may be quickly installed on both new and used vehicles, makes possible a quick operation of the valve with a minimum of effort and provides a means for obtaining a follow-up to-lap operation of the valve. This simple and compact mechanism also provides a power means for operating a standard automotive transmission which is controlled in a manner closely simulating the control of a conventional gear shift lever. With the mechanism of my invention, there is a resistance to movement of the selector, which is a function of the force exerted by the transmission operating motor, and there is also provided a means for operating the transmission solely by the physical effort of the driver in the event of failure of the power means.

While one illustrative embodiment has been described, it is not my intention to limit the scope of the invention to that particular embodiment, or otherwise than by the terms of the appended claims.

I claim:

1. In an automotive vehicle provided with a change-speed transmission and a chassis, mechanism for operating the change-speed transmission comprising a pressure differential operated motor secured to the chassis, valve mechanism for controlling the operation of said motor, a pin, constituting part of the means for mounting the motor upon the chassis, extending from one end of the motor, valve operating members secured to the end of the pin and extending substantially perpendicular thereto, a transmission operating crank arm extending from the casing of the transmission, a valve and transmission operating lever and linkage unit mounted on one side of the transmission casing, a rod member interconnecting the power element of said motor and the aforementioned unit, and a valve operating link, extending substantially parallel to said rod, interconnecting the aforementioned valve operating members and unit.

2. In an automotive vehicle provided with a chassis and a change-speed transmission, mechanism for operating the transmission including a double-acting pressure differential operated motor operably connected with the transmission, valve means for controlling the operation of said motor and housed therein, means for mounting said motor to the chassis, valve operating means secured to said mounting, a valve and transmission operating linkage unit secured to the transmission, and a link directly connecting said valve operating means and said linkage unit, whereby there is provided a compact mechanism for operating the transmission.

3. In an automotive vehicle provided with a change-speed transmission, means for operating the transmission including a double-acting pressure differential operated motor, means secured to the motor for yieldingly mounting the same to the chassis of the vehicle, valve means for controlling the operation of the motor and housed within the casing thereof, a shift rail operating crank extending from the transmission, and valve and transmission operating and controlling means, interconnecting said aforementioned motor mounting, valve mechanism and crank, including a lever and linkage unit connected with said shift rail operating crank.

4. Transmission operating power means for an automotive vehicle including a pressure differential operated motor, control valve mechanism for said motor, means adjacent one end of the motor for mounting the motor to the chassis of the vehicle or to a part secured thereto, a valve operating lever member pivotally connected to said mounting means, a manually operable bell crank lever pivotally connected to said lever member, a connecting rod extending from one end of said motor, a valve operating rod housed within said connecting rod, a valve operating link connected to said first-mentioned lever member at one end thereof and extending alongside of the connecting rod, and a valve and transmission operating lever and linkage unit connected with said link and rod, whereby there is provided a compact transmission operating power means, the connecting rod and valve operating link being so arranged as to readily connect the same at their adjacent ends to the valve and transmission operating unit.

HAROLD W. PRICE.